United States Patent
Braganza et al.

(10) Patent No.: US 12,381,981 B1
(45) Date of Patent: Aug. 5, 2025

(54) CUSTOMER REQUEST ROUTING SYSTEM BASED ON CUSTOMERS AND AGENTS

(71) Applicant: MITEL NETWORKS CORPORATION, Kanata (CA)

(72) Inventors: Jonathan Braganza, Ottawa (CA); Kevin Lee, Kanata (CA); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 0 days.

(21) Appl. No.: 19/045,349

(22) Filed: Feb. 4, 2025

Related U.S. Application Data

(63) Continuation of application No. 17/325,011, filed on May 19, 2021.

(51) Int. Cl.
*H04M 3/00* (2024.01)
*H04M 3/51* (2006.01)

(52) U.S. Cl.
CPC .................. *H04M 3/5175* (2013.01)

(58) Field of Classification Search
CPC ......... H04M 3/5175; G06Q 10/063112; G06Q 50/01; G06F 16/9535
See application file for complete search history.

(56) References Cited

U.S. PATENT DOCUMENTS

| | | | | |
|---|---|---|---|---|
| 2012/0054049 A1* | 3/2012 | Hayes | .................. | G06Q 20/203 705/302 |
| 2013/0282594 A1* | 10/2013 | Gaedcke | ............ | G06Q 30/0201 705/304 |
| 2014/0129942 A1* | 5/2014 | Rathod | ............ | H04N 21/44226 715/720 |
| 2015/0201078 A1* | 7/2015 | Khouri | ................ | H04M 3/5232 379/265.12 |
| 2015/0207983 A1* | 7/2015 | Kang | ....................... | H02K 1/17 348/349 |
| 2016/0042371 A1* | 2/2016 | Klemm | .............. | G06Q 30/0203 705/7.32 |
| 2019/0385107 A1* | 12/2019 | Renfroe | ............ | G06Q 30/0641 |

* cited by examiner

*Primary Examiner* — Rasha S Al Aubaidi

(57) ABSTRACT

A customer contact center system configured to utilize analysis to match a customer with an agent, the contact center system comprising a contact center, a request handler electronically connectable to one or more customer devices and configured to handle customer requests sent to the contact center routing system; and a customer footprint updater in communication with the request handler and electronically connectable to a third-party electronic network connectable to the one or more customer devices.

5 Claims, 6 Drawing Sheets

CUSTOMER REQUEST ROUTING SYSTEM BASED ON CUSTOMERS AND AGENTS

FIELD

Embodiments relate generally to routing of requests from customers by contact centers, and more particularly, to routing of customer requests based on social media clout of customers and agents in a contact center implemented in a computing system.

BACKGROUND

A call center is a centralized office used for receiving or transmitting a large volume of enquiries by telephone. An inbound call center is operated by a business to handle incoming requests from customers for product or service support or information. A contact center is an extension to a call center that provides centralized handling of requests from customers, where the format of the customer requests includes telephone calls, letters, faxes, live support software messages, social media messages and/or posts, instant messages, texts, electronic mail (e-mail), or other electronic communications.

A common approach for contact center routing and queuing of requests is that the computing systems implementing the contact center process datasets storing information such as problem identification, previous support cases and/or grievances, customer profiles (including name, company, role, etc.), expertise matching, agent soft skills, etc. However, contact center computing systems do not take into consideration the influence or power of the customer, especially in political, public relations or business contexts. If a contact center queue or routing mechanism bases the importance of the request solely on why the customer is making the request, the contact center may fail to take into account other factors such as social media importance (e.g., is the customer an "influencer" who has more clout than an average customer). If an agent handling the customer's request does not know in advance that the customer is likely to publicly share his or her experience with the contact center (e.g., on how well the request was handled), then it may be a missed opportunity to protect and/or promote the brand and reputation of the business. Knowing the power or influence of a customer seeking support should lead to a more favorable customer experience.

While equality of customers is typically the norm in contact centers, some concierge services in the hospitality sector are mindful of the social importance of their customers. Some hospitality venues even research their customers in advance to tailor their services to please their customers. Not knowing the clout that a customer possesses in the digital realm could have a negative effect on the delivery of contact center services and subsequent public communications.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Figure 1:
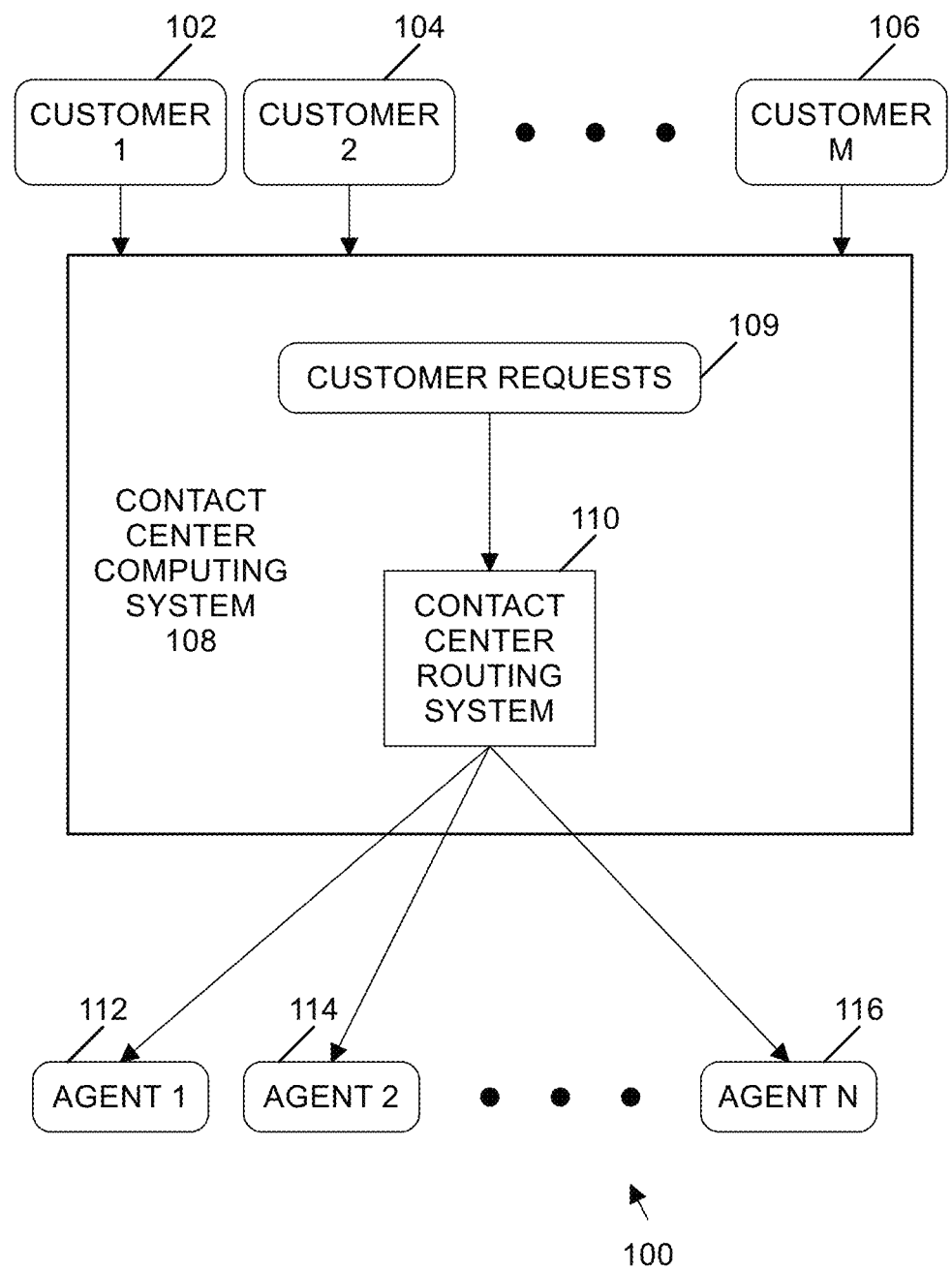
FIG. 1 illustrates a contact center computing system environment according to some embodiments.

The technology described herein provides a method and system for routing of customer requests in a contact center based at least in part on the social media clout of not only the customer, but also of agents that may be selected to handle the customer request.

Matching contact center agents to incoming customers based on social media clout (e.g., via measured overlap of digital footprints or by independent scoring) leads to the routing of incoming customer requests to particular agents based on their performance metrics (wherein social media clout and/or digital footprints are used as the basis for determining compatibility). This approach predicts how an agent might do better in handling a customer request with some customers and not with others based on an analysis of the social media/digital footprints of the customers and the agents. Pairing agents and customers based on social media clout and/or digital footprints optimizes the outcome of handling customer requests by contact center agents and the resulting routings/pairing can be further measured (e.g., like speed dating) to determine how future interactions might be successfully handled.

Existing contact center systems providing intelligent customer request routing and/or queue prioritization rely on one or more of skillset analysis, analysis of call data records (CDRs), natural language processing (NLP) techniques, etc., to derive a context that can be applied to the routing or priority queuing of customer requests in a contact center. Typical intelligent customer request routing systems analyze customer data such as language, dialect/accent, age group, gender, organization, past conversations, products/services purchased or subscribed to, etc., to prioritize handling and/or routing of customer requests to a selected agent.

The technology described herein improves contact center processing of customer requests to leverage digital footprints of both the customers and agents to further refine the services offered to customers. For example, if a customer communicating the request is a first-time requester, as compared to a customer who is well known and prolific in his or her field of expertise, the selected agent may provide a different and/or tailored approach to the services provided by the contact center. The contact center might, for example, assign a more interpersonally effective or more experienced agent to the customer, or assign a different queue priority for handling the request. The technology described herein takes into account that a customer who may have a large following on one social media service, for example, may also be extremely active on one or more other social media services, and manage multiple websites under the customer's name, all falling under the umbrella of a particular subject matter area. Thus, the customer possesses a measurable social media clout that goes beyond accreditations, past calls with an agent, etc., that provides additional context for the intelligent queuing or routing method used by the contact center to handle the customer's request by an appropriate agent.

The technology described herein provides a method to measure the social media clout of people, both customers and agents, that possess a digital footprint and then leverage this information using their social media sphere of influence to prioritize contact center intake (e.g., queue prioritization) and routing of customer requests to agents.

Knowing that a user is relevant or important in their social media space could rely merely on a quantity measurement (e.g., number of followers or number of likes on posts), however, analyzing the type of content that is posted and/or the frequency of contributions to existing conversational feeds (e.g., number of engagements) provides a more useful indicator of how important the user is in the digital realm. In one approach, a business provider operating a contact center may adjust the provision of services based on advance and updated knowledge of the social media presence of the customers and the agents on more than measured quantities of followers and/or likes.

The technology described herein implements social media analytics to measure social media clout indicators (including intangibles such as reputation). If social media clout indicators are measured and determined in advance (and periodically updated) for customers and agents, then that determination can be used in any contact center related action. For example, such an action can include priority queuing of customer requests and customer request routing. In one approach, the routing determination may be made using agents that are grouped together with greater experience handling customers more likely to "go viral" with their public communications about of their contact center experience. The more experienced agents will be able to better respond to customers with stronger social media influence capabilities. In another approach, agents are chosen based on attributes similar to customers as determined through analysis of social media clout indicators. For example, if the social media clout indicators for customer X are due to certain types of posts or significant online presence in certain social media web sites and/or services, the routing system may group agents accordingly to align an agent group to the customer based on experience and greater social media clout indicators.

FIG. 1 illustrates a contact center computing system environment 100 according to some embodiments. Contact center computing system 108 receives customer requests 109 from a plurality of customers, such as customer 1 102, customer 2 104, . . . customer M 106, where M is a natural number. In one embodiment, the number of customers may be very large, such as tens of thousands, hundreds of thousands, or even millions of customers. The number of customer requests to be handled by contact center computing system 108 accordingly may be very large, such as millions, tens of millions, or even hundreds of millions of requests. Contact center routing system 110 receives customer requests 109 and determines how to route the customer requests to agents to handle the customer requests. A plurality of agents, such as agent 1 112, agent 2 114, . . . agent N 116, where N is a natural number, handle customer requests routed to them.

Customer requests may take many forms, now known or hereinafter developed. For example, a customer request may be a telephone call (e.g., a voice call or voice recording), a text, an instant message, an e-mail, an online web form, a social media post, a chat session communication, blog post, or other electronic communication.

As used herein, a customer may also include someone who does not have a customer relationship with the operator of the contact center. For example, the customer may be a salesperson, a marketer, a telemarketer, a consumer, a product reviewer, and so on, contacting the contact center without having purchased any goods or services from the organization operating the contact center.

The plurality of customers operates user computing systems (not shown) to communicate with contact center computing system 108. User computing systems can be any computing device capable of providing communications functionality (e.g., computing devices with one or more of a display, camera, speaker and/or a microphone, such as personal computers, smartphones, tablet computers, personal digital assistants, kiosks, etc.). Similarly, the plurality of agents operates agent computing systems (not shown) to communicate with contact center computing system 108. Agent computing systems can be any computing device capable of providing communications functionality (e.g., computing devices with one or more of a display, camera, speaker and/or a microphone, such as personal computers, smartphones, tablet computers, personal digital assistants, kiosks, etc.). Customer computing systems and agent computing systems communicate with contact center computing system 108 (and thus with each other) using well-known communications methods, such as the Internet, wired networks, wireless networks, telephone networks, etc.

Figure 2:
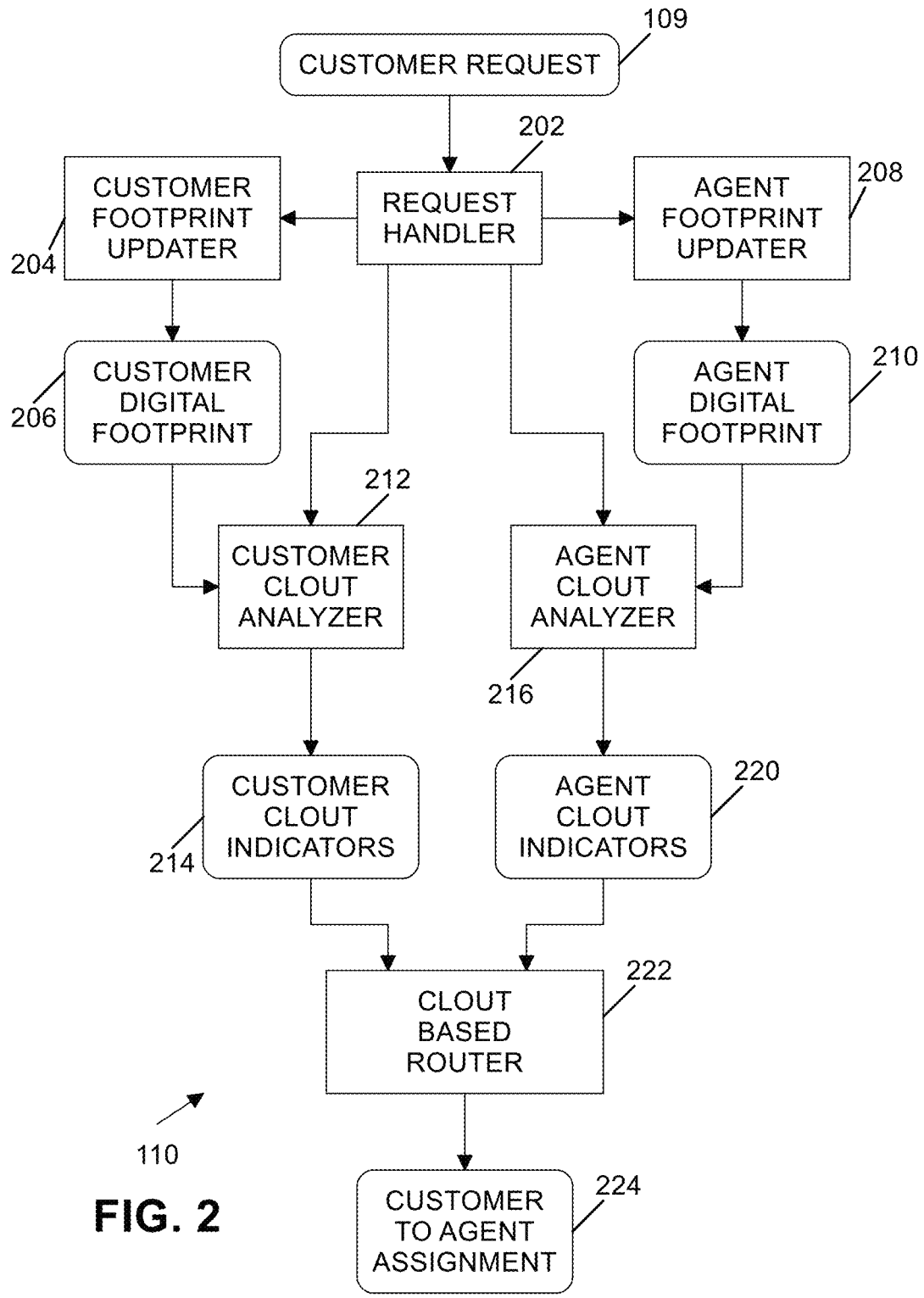
FIG. 2 illustrates a contact center routing system according to some embodiments.

FIG. 2 illustrates contact center routing system 110 according to some embodiments. When a customer request 109 is received (e.g., by any available communications mechanism and/or format), request handler 202 of contact center routing system 110 calls customer footprint updater 204 to update the customer's digital footprint 206. Customer digital footprint 206 can be initially created when the customer joins a service for contact center support. Updating of the customer digital footprint can be done in real-time, in response to receiving a customer request, periodically, such as nightly, weekly, bi-weekly monthly, and so on, or in response to another event relating to the customer such as the customer purchasing a product and/or service from the business operating the contact center computing system 108. The customer digital footprint 206 is maintained in contact center computing system 108 for every customer.

Customer digital footprint 206 comprises data describing the customer's digital activities. In an embodiment, the customer's digital activities include publicly available information. Without limitation, the publicly available information may include any accessible interaction by the customer with websites, social media applications and services, user groups, bulletin boards, and so on. For example, some quantitative data points which may be used to determine a customer digital footprint 206 are shown in Table 1.

TABLE 1

| Facebook | LinkedIn | Instagram | Twitter | Reddit |
|---|---|---|---|---|
| Likes | Likes | Likes | Likes | Upvotes |
| Friends | Connections | | | Friends |
| Followers | Followers | Followers | Followers | |
| Shares | Shares | Shares | Retweets | |
| Following | Following | Following | Following | |
| Comments | Comments | Comments | Replies | Comments |
| Mentions | Mentions | Mentions | Mentions | |
| Hashtags | Hashtags | Hashtags | Hashtags | |

In an embodiment, a "scraper" software utility program is used by customer footprint updater 204 to gather the customer digital footprint data. In embodiment, the scraper comprises one or more "bot" software programs to analyze social media feeds of customers using publicly accessible application program interfaces (APIs). If the social media is firewalled, scraper bots (also known as web crawlers) may be used to trawl through social media feeds, profiles, and web sites for publicly available data.

In another embodiment, the customer's digital activities include privately available information accessible by the contact center computing system 108 (e.g., business records regarding the customer's relationship with the business providing the contact center, such as products purchased (orders, prices, discounts, purchase dates, etc., warranty information, etc.).

In an embodiment, customer digital footprint 206 is gathered by and/or updated by contact center computing system 108 and/or contact center routing system 110. In another embodiment, customer digital footprint 206 is obtained as needed from another source, such as a storage device or other computing system which gathers and/or updates the customer digital footprints for one or more customers.

In some embodiments, customer digital footprint 206 may include data such as public social media posts, response to posts, likes, comments, replies, forwards, views, threads, shares, keywords, post categories, topics, references to the customer, viral posts over a predetermined quantity, whether the customer is a verified user (e.g., Facebook posts, Facebook group memberships, LinkedIn posts, LinkedIn likes (given/received)); likes to an original post compared to likes in response to a post (e.g., the customer received more likes in response to a post that had fewer likes); ranking customer's likes in response to a post compared to others responding to same post, number of followers as compared to number following; number of viral threads (e.g., likes and/or resharing of an authored post less than 100 times, between 101 and 1000 times; between 1001 and 5000 times; between 5001 and 10,000 times, etc.); Social media threads (participated in or participating in); number of posts for each identified social media service or platform; number of authored posts liked; number of authored posts that were shared by others (e.g., retweeted); number of followers versus number following; frequency of mentions; group memberships (for example, "Bitcoin Scripting for Experts"; "Home Theater Gadget Reviews", etc.); types of posts (cat photos versus "Here's why I think the Python high-level programming language sucks: . . . "; topics of posts); number of viral posts (likes and/or resharing of an authored post less than 100 times, between 101 and 1000 times; between 1001 and 5000 times; between 5001 and 10,000 times, etc.); scoring on particular frequencies of social media posts on a particular topics; social media commonality (e.g., participation on the same topics, same groups, high scoring for same topics); listed keywords in profiles, and many others. The number and types of data points gather for customer digital footprint 202 are implementation dependent and may include any data now known or hereinafter developed regarding a customer's digital activities.

In another embodiment, customer digital footprint 206 may be augmented with information from additional sources that are not specific to social media. For example, information such as customer product reviews, videos, blogs, academic-related publications, patents, accreditations, resumes, skills, memberships in organizations, subject matter expertise (self-declared or objectively determined), certifications, and so on.

In a similar manner, an agent digital footprint 210 is determined by agent footprint updater 208 for one or more agents of the contact center. Agent digital footprint 210 can be initially created when the agent starts a position in the contact center. An agent's digital footprint 210 includes at least some of the data points that are in a customer's digital footprint 206. In addition, agent digital footprint 210 may include social media content internal to the business operating the contact center (e.g., internal posts, authored content (e.g., technical support articles, records, etc.). In one approach, agent digital footprint 210 is updated periodically (e.g., nightly, weekly, bi-weekly, monthly, etc.) based on recent digital activity by an agent. In another approach, the agent digital footprint is updated prior to the start of an agent's workday or shift in the contact center.

Request handler 202 calls customer clout analyzer 212 to analyze the customer's digital footprint 206 and the customer request 109 to determine one or more customer clout indicators 214. Request handler 202 calls agent clout analyzer 216 to analyze the agent's digital footprint 210 to determine one or more agent clout indicators 220.

When analyzing the customer digital footprint, customer clout analyzer 212 determines which data points and/or types of data points in customer digital footprint 202 are to be used to determine customer clout indicators 210. In at various approaches, different subsets of data points from customer digital footprint 202 are analyzed, depending on the implementation. In a similar manner, agent clout analyzer 216 determines which data points and/or types of data points in agent digital footprint 210 are to be used to determine agent clout indicators 220. In at various approaches, different subsets of data points from agent digital footprint 208 are analyzed, depending on the implementation.

In one approach, customer clout analyzer 212 determines the importance (e.g., the weights) of selected data points and/or types of data points in customer digital footprint 202 as compared to other data points and/or types of data points in customer digital footprint 202. In one embodiment, this includes a time element, reflecting the importance of selected data points and/or types of data points. For example, data points from a customer who is a new social media user (e.g., less than two months) may be given less weight than data points from an experienced customer (e.g., the customer has been a social media user for more than five years). In another example, data points from a customer who has under 10,000 followers on a selected social media service may be given less weight than data points from a customer who has more than 1,000,000 followers on the same social media service.

In a similar manner, agent clout analyzer 216 determines the importance (e.g., the weights) of selected data points and/or types of data points in agent digital footprint 210 to be used by agent clout analyzer 216 to determine agent clout indicators 220. In one embodiment, the importance of the selected data points and/or types of data points of the agent digital footprint are the same as from the customer digital footprint.

In one implementation, agent digital footprint 210 includes factors specific to agents, such as experience level, number of customers served, technical specialty, performance review scores, service ratings, customer reviews of agent performance, and so on.

In various embodiments, different selections of data points from customer digital footprint 206 are used by customer clout analyzer 212 to determine customer clout indicators 214. Similarly, in various embodiments, different selections of data points from agent digital footprint 210 are used by agent clout analyzer 216 to determine agent clout indicators 220.

In one approach, customer clout analyzer 212 and agent clout analyzer 216 are combined into a single component that collectively and simultaneously analyzes both customer digital footprint 206 and agent digital footprint 210 to produce the clout indicators 214, 220.

In an embodiment, customer clout indicators 214 and agent clout indicators comprise a single value, such as a number (e.g., between 1 and 100), a letter (e.g., A to Z), an enumerated type (e.g., bronze, silver, gold, platinum, diamond), etc. For example, if the customer clout indicator of a customer is 32, and the agent clout indicator of an available agent is 50, then the customer request received from the customer may be routed to the available agent (assuming in this example that an agent clout indicator of 50 for the agent means that the agent is better suited to handle the customer's request than an agent with an agent clout indicator of 15, for example). In this simple example, comparing the single value of the customer clout indicator to the single value of the agent clout indicator is easily done to provide the routing of the customer request by clout-based router 222 as customer to agent assignment 224.

In another embodiment, customer clout indicators 214 and agent clout indicators 220 comprise multiple values of any type. In this embodiment, clout-based router 222 analyzes the multiple values (which may not be the same set of data points for the customer and the agent) collectively and comprehensively to determine customer to agent assignment 224.

In an embodiment, customer to agent assignment 224 comprises a matched pair of customer identifier (ID) and agent ID and contact center routing system 110 routes the customer request to the selected agent. In another embodiment, customer to agent assignment 224 comprises a customer ID and an associated set of a plurality of agent IDs (indicating a plurality of agents are equally suited to handle the customer's request). In this case, contact center computing system 108 may determine if an agent in the set is currently available to handle the customer request and route the request accordingly.

In another approach, customer clout analyzer 212, agent clout analyzer 216, and clout-based router 222 are combined into a single component that collectively and simultaneously analyzes both customer digital footprint 206 and agent digital footprint 210 to produce the clout indicators 214, 220 and determines the customer to agent assignment 224 based at least in part on the clout indicators.

There are many types of data that can be included in the digital footprints 206, 210, and many ways that the data can be analyzed in implementation dependent designs to determine the clout indicators and determine the customer request routing decision. These designs may be updated frequently depending on changing business conditions and contact center support strategies and priorities, the rising and falling popularity of various social media services, and so on.

One example, non-limiting, approach uses the sample of Table 1 describe above. For example, assume each row is a match type, and for every row, customer clout analyzer 212 and agent clout analyzer 216 searches for a match of the customer and the agent across all social media services. Each match is given a minimum relative score of 1 point. An overall score is calculated for all social media services. The highest overall score is the best match between an agent and customer.

For example, a "Like" on Facebook by the customer on a specific article and a finding that a potential agent has liked the same article, but on LinkedIn, results in 1 point. However, if the match is on the same social media service, then this results in 2 points. If a customer and agent like the same image on Instagram, this results in a score of 1.5. In one approach, each match type is broken down into the separate categories. For every overall social media profile, the customer clout analyzer 212 determines the customer's top five social media interests and the agent clout analyzer 216 determines the agent's top five social media interests. For any leftover data which was not matched in the prior section, if the interest types are aligned in the top five interests of both the customer and an agent, this results in a score of 0.1. For instance, an article from a technical magazine could be considered a technology interest. For example, if a customer liked an article from Wired magazine on the Facebook social media service, and one of the agent's top five interests is technology, but the agent and the customer didn't like the same article as shown in their digital footprints, this still could result in an additional +0.1 score. In another variation, customer clout analyzer 212 and agent clout analyzer 216 determine if an agent and the customer have interacted on any social media service. For example, if a customer and agent follow each other on the Twitter social media service, this results in a score of 50 points. However, in one approach these points are only given if it is determined the interaction between the customer and the agent is positive.

In another example, clout indicator scoring and data for making a routing decision by clout-based router 222 is shown in Table 2.

TABLE 2

| Agent X (AX) | Customer X (CX) | Score | Action | Example/Comment |
| --- | --- | --- | --- | --- |
| Social Media X post (content likeness) | Social Media Y post (content likeness) | +1 | Route CX to AX Display strong compatibility icon | Imbrication of Content: CX posts to Facebook (X) about "My top ten reasons on the importance of eco-friendly data farms". AX posts to Reddit (Y) about the "Why environmentally friendly server farms are the future!" |

TABLE 2-continued

| Agent X (AX) | Customer X (CX) | Score | Action | Example/Comment |
|---|---|---|---|---|
| Social Media X post (favorability likeness) | Social Media X post (favorability likeness) | +0.5 | Route CX to AX Display strong compatibility icon | Common Interests: CX liked a post about "Microsoft introduces A.I. based chit-chat engine." AX liked 4 posts about A.I. in home reno design software. |
| Social Media X Content ID 001 (total favorability index) | Social Media X post001 (total favorability index) | +1 | Route CX to AX Display strong compatibility icon | Total Likes |
| Social Media X is used. | Social Media X is used. | +0.5 | Route CX to any agent Display "light" compatibility icon | They both use Facebook. |
| Social Media X is used | Social Media Y is used | +0.5 | Route to any agent Display "light" compatibility icon | One uses Facebook. Other uses Twitter. |
| Social Media X Connections (independently popular) | Social Media Y is used | +1.0 (<100) 1.5 (101-499) 2.0 (499-1000) 3.0 (1001-n) | Always route CX to AX with highest score | Agent X with "guru" Social Media presence routed to a customer who has basic social media presence. |
|  | Social Media X Connections (independently popular) | +1.0 (<100) 1.5 (101-499) 2.0 (499-1000) 3.0 (1001-n) | No compatible agent; collect metrics for next call | No Agent to match, therefore collect Social Media intel for future calls. |
| Agent X connected to Customer X on any social media | Customer X connected to Agent X on any social media | +10.0 | Valid - Route CX to AX Invalid - Route CX to CY (depending on availability) | Encourage agents to connect with clients through social media. |

In one embodiment, an overall customer clout score is calculated by adding points assigned during analysis of the customer clout indicators in relation to the agent clout indicators. An overall agent clout score for a plurality of agents is calculated in a similar manner. In an embodiment, the clout scores are compared, and the customer request is assigned to the agent having the clout score closest to the customer's clout score. In another embodiment, the customer request is assigned to the agent have the highest clout score as compared with the customer clout score.

In one implementation, an agent can be taken out of consideration as a match for the customer if the estimated wait time for the agent to handle the customer request is more than a threshold.

In one embodiment, one or more of customer clout analyzer 212, agent clout analyzer 216, and clout-based router 222 are implemented as a machine learning (ML) model according to know artificial intelligence techniques to determine one or more of customer clout indicators 214, agent clout indicators 220, and customer to agent assignment 224. In an embodiment, known NLP classification techniques are applied to nouns, verbs, adjectives, etc., of the social media content of the customers and the agents to build the digital footprints.

Further, weights can be assigned and/or updated to selected ones of the clout indicators to indicate importance or priority of selected ones of the clout indicators in making the routing decision. Additionally, rules/actions can be assigned to guide routing decisions (as shown in Table 2).

In one embodiment, a system administrator for the contact center computing system 108 sets the weights, updates the weights, and/or sets one or more thresholds for clout-based router 222 to determine the routing of the customer request. For example, if one or more of the customer clout indicators is more than a threshold, the customer request is routed to an agent in a first, more experienced pool of agents, and if the customer clout indicators is equal to or less than the threshold, the customer request is routed to an agent in a second, less experience pool of agents.

Figure 3:
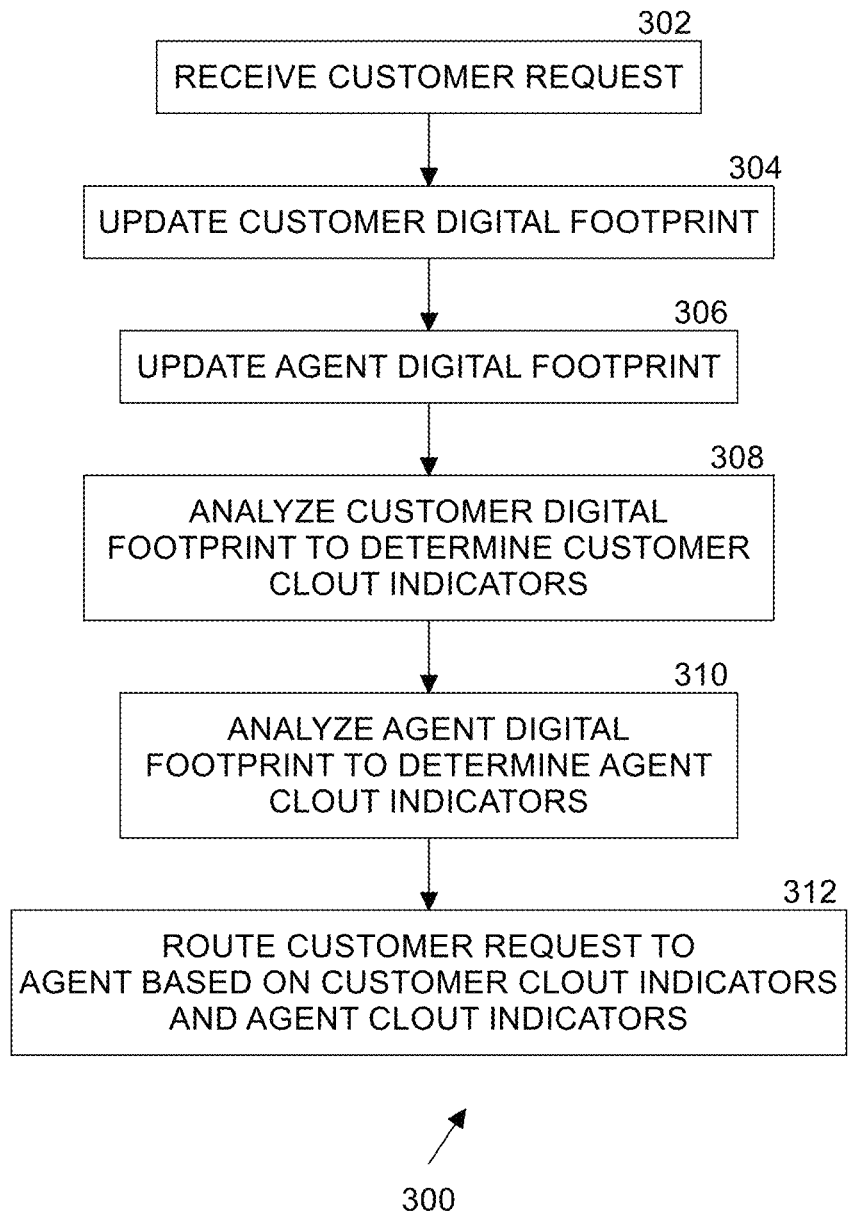
FIG. 3 is a flow diagram of clout analyzer and routing processing according to some embodiments.

FIG. 3 is a flow diagram 300 of clout analyzer and routing processing according to some embodiments. At block 302, request handler 202 receives a customer request 109 from a customer (e.g., one of customer 1 102, customer 2 104, . . . customer M 106). At block 304, customer footprint updater 204 updates the customer digital footprint 206. At block 306, agent footprint updater 208 updates the agent digital footprint 210 of one or more agents currently working in the contact center handling customer requests. In another embodiment, updating of the agent digital footprints of the agents is performed at a time earlier than the receipt of the customer request (e.g., the previous night, the previous week, the previous month, etc., at the beginning of the agent's shift, and so on). At block 308, customer clout analyzer 212 analyzes the customer digital footprint 206 to determine one or more customer clout indicators 214. At block 310, agent clout analyzer 216 analyzes the agent digital footprint 210 of at least one agent 112, 114, . . . 116 to determine one or more agent clot indicators 220. At block 312, clout-based router 222 routes the customer request 109 to an agent based at least in part on the customer clout indicators 214 and agent clout indicators 220. The selected agent then handles the customer request for the customer.

Embodiments may also be applied to situations other than contact centers. For example, social media clout could also play a role in prioritizing office communications (e.g., a chief executive officer (CEO) office may prioritize a call from a video blogger with a high social media clout ahead of a call from a traditional journalist). Also, sales calls could prioritize whose call is taken first based on how likely that the caller will communicate his or her sales experience in a widespread manner (e.g., a well-known technology reviewer as compared to an unidentified person).

Figure 4:
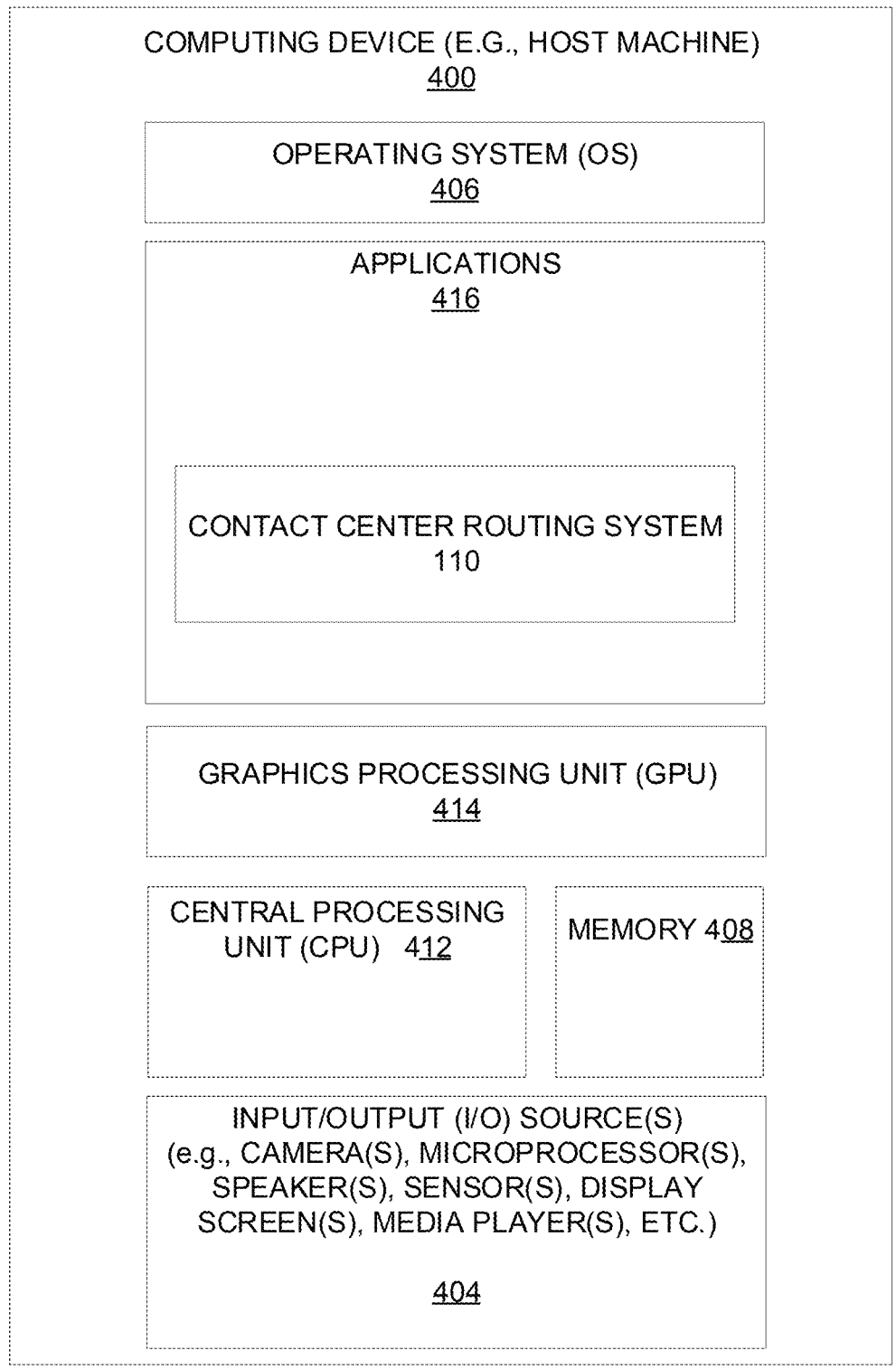
FIG. 4 illustrates a computing device employing a contact center routing system, according to an embodiment.

FIG. 4 illustrates one embodiment of a computing device 400 (e.g., a host machine) executing one or more applications 416 such as content center routing system 110. Computing device 400 (e.g., smart wearable devices, virtual reality (VR) devices, head-mounted display (HMDs), mobile computers, Internet of Things (IoT) devices, laptop computers, desktop computers, server computers, smartphones, etc.) is shown as hosting content center routing system 110.

In some embodiments, some or all of content center routing system 110 may be hosted by or part of firmware of graphics processing unit (GPU) 414. In yet other embodiments, some or all of content center routing system 110 may be hosted by or be a part of firmware of central processing unit ("CPU" or "application processor") 412.

In yet another embodiment, content center routing system 110 may be hosted as software or firmware logic by operating system (OS) 406. In yet a further embodiment, content center routing system 110 may be partially and simultaneously hosted by multiple components of computing device 400, such as one or more of GPU 414, GPU firmware (not shown in FIG. 4), CPU 412, CPU firmware (not shown in FIG. 4), operating system 406, and/or the like. It is contemplated that content center routing system 110 or one or more of the constituent components may be implemented as hardware, software, and/or firmware.

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 400 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 400 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 400 may include a mobile computing device employing a computer platform hosting an integrated circuit ("IC"), such as system on a chip ("SoC" or "SOC"), integrating various hardware and/or software components of computing device 400 on a single chip.

As illustrated, in one embodiment, computing device 400 may include any number and type of hardware and/or software components, such as (without limitation) GPU 414, a graphics driver (also referred to as "GPU driver", "graphics driver logic", "driver logic", user-mode driver (UMD), UMD, user-mode driver framework (UMDF), UMDF, or simply "driver") (not shown in FIG. 4), CPU 412, memory 408, network devices, drivers, or the like, as well as input/output (I/O) sources 404, such as touchscreens, touch panels, touch pads, virtual or regular keyboards, virtual or regular mice, ports, connectors, etc.

Computing device 400 may include operating system (OS) 406 serving as an interface between hardware and/or physical resources of the computer device 400 and a user. It is contemplated that CPU 412 may include one or more processors, such as processor(s) 402 of FIG. 4, while GPU 414 may include one or more graphics processors (or multiprocessors).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated that some processes of the graphics pipeline as described herein are implemented in software, while the rest are implemented in hardware. A graphics pipeline (such as may be at least a part of conferencing application 110) may be implemented in a graphics coprocessor design, where CPU 412 is designed to work with GPU 414 which may be included in or co-located with CPU 412. In one embodiment, GPU 414 may employ any number and type of conventional software and hardware logic to perform the conventional functions relating to graphics rendering as well as novel software and hardware logic to execute any number and type of instructions.

Memory 408 may include a random-access memory (RAM) comprising application database having object information. A memory controller hub (not shown in FIG. 4) may access data in the RAM and forward it to GPU 414 for graphics pipeline processing. RAM may include double data rate RAM (DDR RAM), extended data output RAM (EDO RAM), etc. CPU 412 interacts with a hardware graphics pipeline to share graphics pipelining functionality.

Processed data is stored in a buffer in the hardware graphics pipeline, and state information is stored in memory 408. The resulting image is then transferred to I/O sources 404, such as a display component for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 408 may comprise a pre-allocated region of a buffer (e.g., frame buffer); however, it should be understood by one of ordinary skill in the art that the embodiments are not so limited, and that any memory accessible to the lower graphics pipeline may be used. Computing device 400 may further include an input/output (I/O) control hub (ICH) (not shown in FIG. 4), as one or more I/O sources 404, etc.

CPU 412 may include one or more processors to execute instructions to perform whatever software routines the computing system implements. The instructions frequently involve some sort of operation performed upon data. Both data and instructions may be stored in system memory 408 and any associated cache. Cache is typically designed to have shorter latency times than system memory 408; for example, cache might be integrated onto the same silicon chip(s) as the processor(s) and/or constructed with faster static RAM (SRAM) cells whilst the system memory 408 might be constructed with slower dynamic RAM (DRAM) cells. By tending to store more frequently used instructions and data in the cache as opposed to the system memory 408, the overall performance efficiency of computing device 400 improves. It is contemplated that in some embodiments, GPU 414 may exist as part of CPU 412 (such as part of a physical CPU package) in which case, memory 408 may be shared by CPU 412 and GPU 414 or kept separated.

System memory 408 may be made available to other components within the computing device 400. For example, any data (e.g., input graphics data) received from various interfaces to the computing device 400 (e.g., keyboard and mouse, printer port, Local Area Network (LAN) port, modem port, etc.) or retrieved from an internal storage element of the computer device 400 (e.g., hard disk drive) are often temporarily queued into system memory 408 prior to being operated upon by the one or more processor(s) in the implementation of a software program. Similarly, data that a software program determines should be sent from the computing device 400 to an outside entity through one of the computing system interfaces, or stored into an internal storage element, is often temporarily queued in system memory 408 prior to its being transmitted or stored.

Further, for example, an ICH may be used for ensuring that such data is properly passed between the system memory 408 and its appropriate corresponding computing system interface (and internal storage device if the computing system is so designed) and may have bi-directional point-to-point links between itself and the observed I/O sources/devices 404. Similarly, an MCH may be used for managing the various contending requests for system memory 408 accesses amongst CPU 412 and GPU 414, interfaces and internal storage elements that may proximately arise in time with respect to one another.

I/O sources 404 may include one or more I/O devices that are implemented for transferring data to and/or from computing device 400 (e.g., a networking adapter); or, for a large-scale non-volatile storage within computing device 400 (e.g., hard disk drive). User input device, including alphanumeric and other keys, may be used to communicate information and command selections to GPU 414. Another type of user input device is cursor control, such as a mouse, a trackball, a touchscreen, a touchpad, or cursor direction keys to communicate direction information and command selections to GPU 414 and to control cursor movement on the display device. Camera and microphone arrays of computer device 400 may be employed to observe gestures, record audio and video and to receive and transmit visual and audio commands.

Computing device 400 may further include network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 400 may vary from implementation to implementation depending upon numerous factors, such as price constraints, performance requirements, technological improvements, or other circumstances. Examples of the electronic device or computer system 400 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more tangible non-transitory machine-readable media having stored thereon machine-executable instructions that, when executed by one or more machines such as a computer, network of computers, or other electronic devices, may result in the one or more machines carrying out operations in accordance with embodiments described herein. A tangible non-transitory machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Machine Learning Overview

A machine learning algorithm is an algorithm that can learn based on a set of data. Embodiments of machine learning algorithms can be designed to model high-level abstractions within a data set. For example, classification algorithms can be used to determine which of several categories to which a given input belongs; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 5:
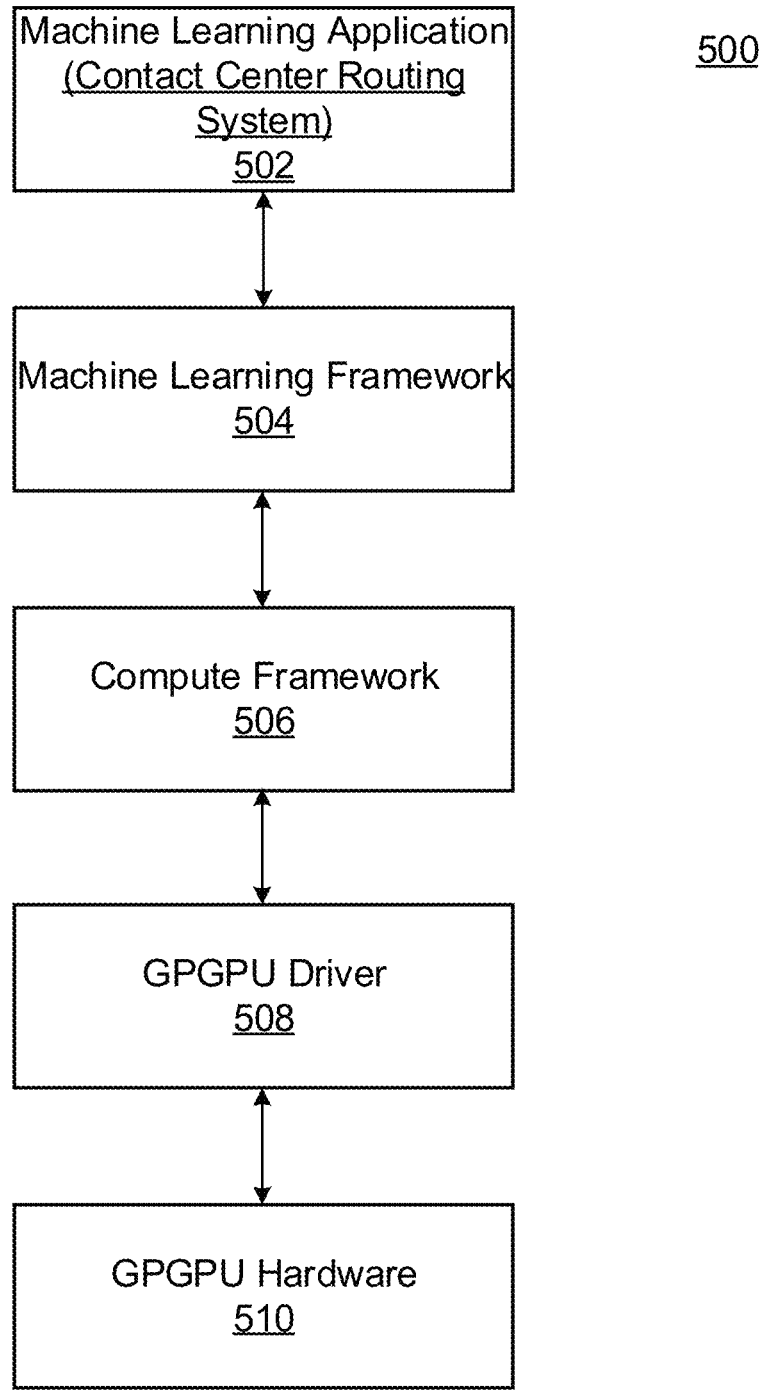
FIG. 5 illustrates a machine learning software stack, according to an embodiment.

FIG. 5 is a generalized diagram of a machine learning software stack 500. A machine learning application 502 (e.g., content center routing system 110) can be configured to train a neural network using a training dataset or to use a trained deep neural network to implement machine intelligence. The machine learning application 502 can include training and inference functionality for a neural network and/or specialized software that can be used to train a neural network before deployment. The machine learning application 502 can implement any type of machine intelligence including but not limited to classification, image recognition, mapping and localization, autonomous navigation, speech synthesis, medical imaging, or language translation.

Hardware acceleration for the machine learning application 502 can be enabled via a machine learning framework 504. The machine learning framework 504 can provide a library of machine learning primitives. Machine learning primitives are basic operations that are commonly performed by machine learning algorithms. Without the machine learning framework 504, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 504. Exemplary primitives include tensor convolutions, activation functions, and pooling, which are computational operations that are performed while training a convolutional neural network (CNN). The machine learning framework 504 can also provide primitives to implement basic linear algebra subprograms performed by many machine-learning algorithms, such as matrix and vector operations.

The machine learning framework 504 can process input data received from the machine learning application 502 and generate the appropriate input to a compute framework 506. The compute framework 506 can abstract the underlying instructions provided to a GPGPU driver 505 to enable the machine learning framework 504 to take advantage of hardware acceleration via the GPGPU hardware 510 without requiring the machine learning framework 504 to have intimate knowledge of the architecture of the GPGPU hardware 510. Additionally, the compute framework 506 can enable hardware acceleration for the machine learning framework 504 across a variety of types and generations of the GPGPU hardware 510.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different tasks.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 6:
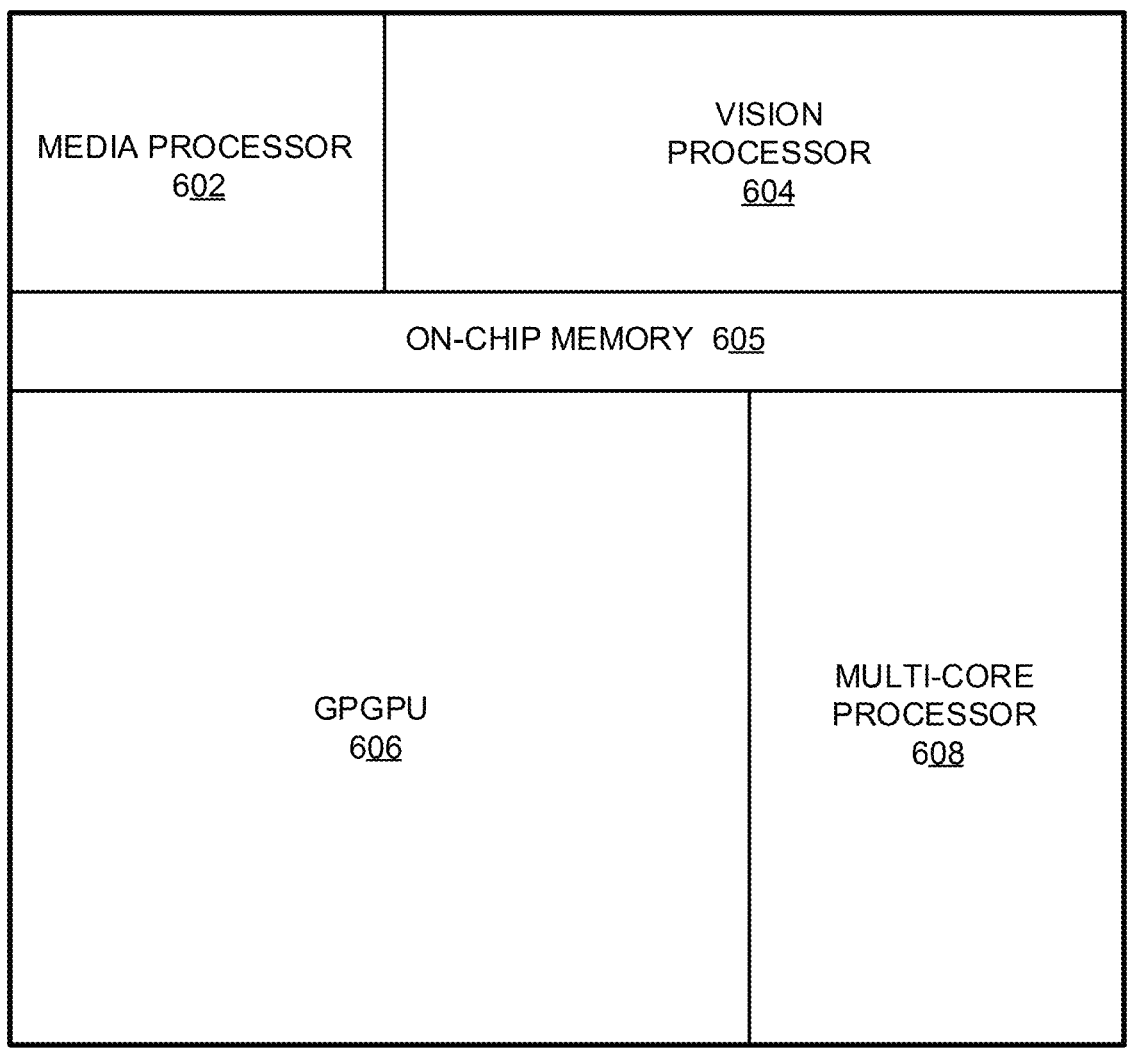
FIG. 6 illustrates an exemplary system on a chip (SOC) suitable for performing customer request routing according to some embodiments.

FIG. 6 illustrates an exemplary system on a chip (SOC) 600 suitable for performing inferencing using a trained model. One or more components of FIG. 6 may be used to implement content center routing system 110. The SOC 600 can integrate processing components including a media processor 602, a vision processor 604, a GPGPU 606 and a multi-core processor 608. The SOC 600 can additionally include on-chip memory 605 that can enable a shared on-chip data pool that is accessible by each of the processing components. The processing components can be optimized for low power operation to enable deployment to a variety of machine learning platforms, including autonomous vehicles and autonomous robots.

The multi-core processor 608 can include control logic to assist with sequencing and synchronization of data transfers and shared memory operations performed by the media processor 602 and the vision processor 604. The multi-core processor 608 can also function as an application processor to execute software applications that can make use of the inferencing compute capability of the GPGPU 606. For example, at least a portion of the content center routing system logic can be implemented in software executing on the multi-core processor 608. Such software can directly issue computational workloads to the GPGPU 606, or the computational workloads can be issued to the multi-core processor 608, which can offload at least a portion of those operations to the GPGPU 606.

Flowcharts representative of example hardware logic, machine readable instructions, hardware implemented state machines, and/or any combination thereof for implementing computing device 600, for example, are shown in FIG. 3. The machine-readable instructions may be one or more executable programs or portion(s) of an executable program for execution by a computer processor such as the processor 414 shown in the example computing device 400 discussed above in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowcharts illustrated in FIG. 3, many other methods of implementing the example contact center routing system 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A customer contact center system configured to route customer request and analysis to match a customer with an agent, the customer contact center system comprising a contact center routing system comprising:

a request handler electronically connectable to one or more customer devices and configured to handle customer requests sent to the contact center routing system;

a customer footprint updater in communication with the request handler and electronically connectable to a third-party electronic network connectable to the one or more customer devices, the customer footprint updater being configured to:

access the third-party electronic network and retrieves data corresponding to an account of one of a plurality of customers;

use the retrieved data to generate locally stored footprint data, the locally footprint stored data being generated as the customer footprint updater creates or updates a customer digital footprint for the one of the plurality of customers, the locally stored footprint data corresponding to the customer digital footprint;

access an internal data store of the contact center system and retrieves local data corresponding to prior interactions between the customer associated with the connection request from the one of the one or more customer devices and the contact center system; and use the retrieved local data to generate the locally stored footprint data corresponding to the customer digital footprint so that the customer digital footprint of the one of the plurality of customers comprises prior interactions between the one of the one or more customer devices and the contact center system, including orders, purchases, purchase dates, warranty information, and discounts;

the contact center routing system being configured to:

communicate with one or more customer devices and with one or more agent devices;

receive a connection request from one of the one or more customer devices;

select one of the one or more agent devices for connection to the one or more customer devices in response to the connection request;

connect the one of the one or more customer devices to the one of the one or more agent devices, and control communication between the one or more customer devices and the one or more agent devices;

an agent footprint updater in communication with the request handler, the agent footprint updater being configured to access a customer file of each of a plurality of agents and creates or updates an agent digital footprint for each of the plurality of agents; and a customer clout analyzer in communication with the request handler, the customer clout analyzer comprising a neural network that is a feedforward network implemented as an acyclic graph with nodes arranged in layers, the neural network having an input layer, an output layer, and a hidden layer separating the input layer and the output layer, the customer clout analyzer being configured to:

receive, by the input layer, the locally stored footprint data;

identify, by the hidden layer, relevant parameters in the locally stored footprint data and determine the identified relevant parameters to be customer clout indicators;

assign, by the hidden layer, values to the customer clout indicators;

output, by the output layer, the identified relevant parameters as the customer clout indicators with the assigned values, subsequent to identifying relevant parameters as customer clout indicators and analyzing the customer clout indicators by the neural network; and determine a presence and magnitude, for the one of the plurality of customers, of the customer clout indicators by analyzing the customer digital footprint of the one of the plurality of customers, and determining a request of the one of plurality of customers that is received by the request handler.

2. The customer contact center system of claim 1, further comprising:

an agent clout analyzer in communication with the request handler, the agent clout analyzer being configured to determine agent clout indicators by analyzing the agent digital footprint of each of the plurality of agents.

3. The customer contact center system of claim 2, the agent clout analyzer being configured to use natural language processing (NLP) classification.

4. The customer contact center system of claim 2, further comprising a clout-based routing system configured to analyze the presence and the magnitude of the customer clout indicators, including the customer request received by the request handler, and the agent clout indicators, wherein based on inputs by a system administrator the customer contact center system determines values and thresholds for the clout-based routing system to analyze a routing of the customer request; and connect the one of the plurality of customers to one of the plurality of agents based on the analysis to control the communication between the one or more customer devices and the one or more agent devices.

5. The customer contact center system of claim 4, the clout-based routing system being configured to use natural language processing (NLP) classification.

* * * * *